US008881499B2

(12) United States Patent
Dolan et al.

(10) Patent No.: US 8,881,499 B2
(45) Date of Patent: Nov. 11, 2014

(54) UNDER WATER HYDROGEN AND OXYGEN POWERED HYDRAULIC IMPULSE ENGINE

(75) Inventors: Timothy F. Dolan, Trumbull, CT (US); William C. Henderson, IV, Hackensack, NJ (US)

(73) Assignee: Saigeworks, LLC, Trumbull, CT (US)

( * ) Notice: Subject to any disclaimer, the term of this patent is extended or adjusted under 35 U.S.C. 154(b) by 122 days.

(21) Appl. No.: 13/465,460

(22) Filed: May 7, 2012

(65) Prior Publication Data

US 2013/0118446 A1 May 16, 2013

Related U.S. Application Data

(60) Provisional application No. 61/485,288, filed on May 12, 2011.

(51) Int. Cl.

| | |
|---|---|
| ***F02C 7/00*** | (2006.01) |
| ***F02C 3/30*** | (2006.01) |
| ***B63H 11/14*** | (2006.01) |
| ***F04F 1/16*** | (2006.01) |
| ***F04F 1/06*** | (2006.01) |
| ***B63G 8/08*** | (2006.01) |
| ***F02B 75/02*** | (2006.01) |

(52) U.S. Cl.

CPC ................ *F02B 75/02* (2013.01); *B63H 11/14* (2013.01)

USPC ....... 60/39.53; 60/39.54; 60/39.55; 60/39.57; 60/775; 440/45; 417/73; 417/74; 417/75; 417/118; 417/119; 114/337

(58) Field of Classification Search

USPC .......... 60/39.53–39.55, 57, 775; 440/45, 441; 415/80–82; 114/337; 417/73–75, 417/118–119

See application file for complete search history.

(56) References Cited

U.S. PATENT DOCUMENTS

| | | | | |
|---|---|---|---|---|
| 46,683 | A * | 3/1865 | Linton | 417/73 |
| 368,678 | A | 8/1887 | McDougall | |
| 632,662 | A | 9/1899 | Tatham | |
| 676,164 | A | 6/1901 | Villar | |
| 1,029,039 | A | 6/1912 | Badcock | |
| 1,243,296 | A * | 10/1917 | Humphrey | 417/75 |

(Continued)

FOREIGN PATENT DOCUMENTS

| | | |
|---|---|---|
| EP | 0011286 | 5/1980 |
| GB | 895015 | 4/1962 |

(Continued)

OTHER PUBLICATIONS

EP0011286 English Language Abstract (1 page).

*Primary Examiner* — Lindsay Low
*Assistant Examiner* — Charles Brauch

(57) ABSTRACT

Apparatus includes an ignition system that repeats an ignition cycle by providing hydrogen and oxygen and also provides a control spark with a sufficient amount of energy for igniting a combustible mixture of hydrogen and oxygen. The combustion chamber is immersed in an aqueous fluid, fills with the same or other aqueous fluid, receives the hydrogen and oxygen therein, receive the control spark to ignite the combustible mixture of hydrogen and oxygen to cause a combustion reaction to occur and form steam that yields a specific amount of heat energy, and provides the aqueous fluid from the combustion chamber in response to the substantial increase in pressure on the aqueous fluid contained therein.

20 Claims, 6 Drawing Sheets

Hydrogen and oxygen powered impulse engine

(56) References Cited

U.S. PATENT DOCUMENTS

| | | | | | |
|---|---|---|---|---|---|
| 2,734,578 | A | | 2/1956 | Walter | |
| 2,885,988 | A | | 5/1959 | Myers | |
| 2,911,957 | A | | 11/1959 | Kumm | |
| 3,060,682 | A | | 10/1962 | Kemenczky | |
| 3,265,027 | A | | 8/1966 | Brown et al. | |
| 3,494,317 | A | | 2/1970 | Korper | |
| 3,787,144 | A | * | 1/1974 | Wood | 417/74 |
| 3,897,173 | A | * | 7/1975 | Mandroian | 417/73 |
| 4,120,160 | A | | 10/1978 | Davis | |
| 5,692,371 | A | | 12/1997 | Varshay et al. | |
| 6,484,491 | B1 | * | 11/2002 | Thordarson | 60/211 |
| 6,620,004 | B1 | | 9/2003 | Piper | |
| 6,655,070 | B2 | | 12/2003 | Wood | |
| 6,698,183 | B1 | | 3/2004 | Thordarson | |
| 7,128,624 | B1 | | 10/2006 | Goldmeer et al. | |
| 2011/0113750 | A1 | | 5/2011 | Colautti | |

FOREIGN PATENT DOCUMENTS

| | | |
|---|---|---|
| GB | 1345627 | 1/1974 |
| GB | 2313410 | 11/1997 |
| WO | 2009078049 | 6/2009 |

* cited by examiner

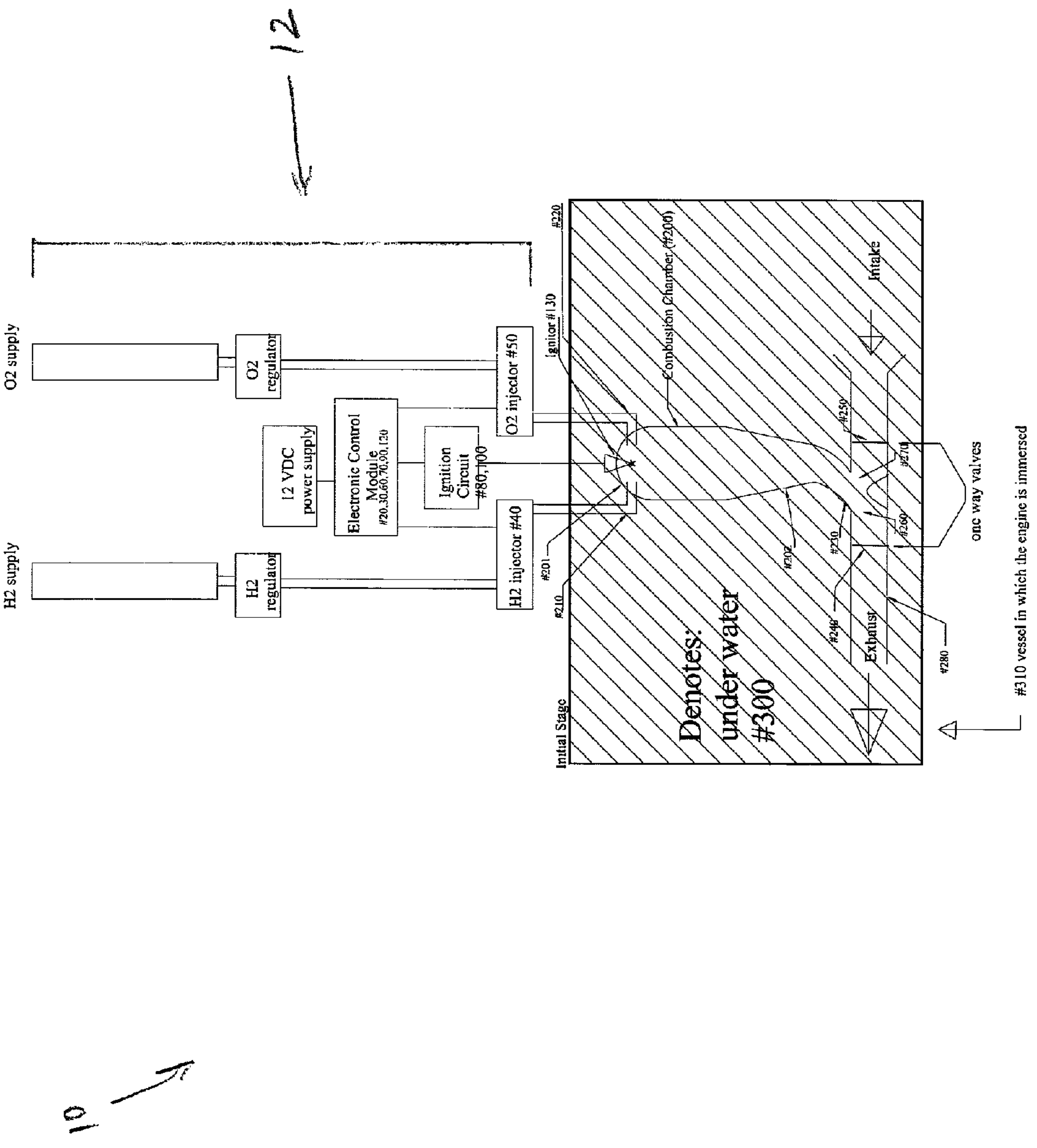
Fig 2 (a): Hydrogen and oxygen powered impulse engine

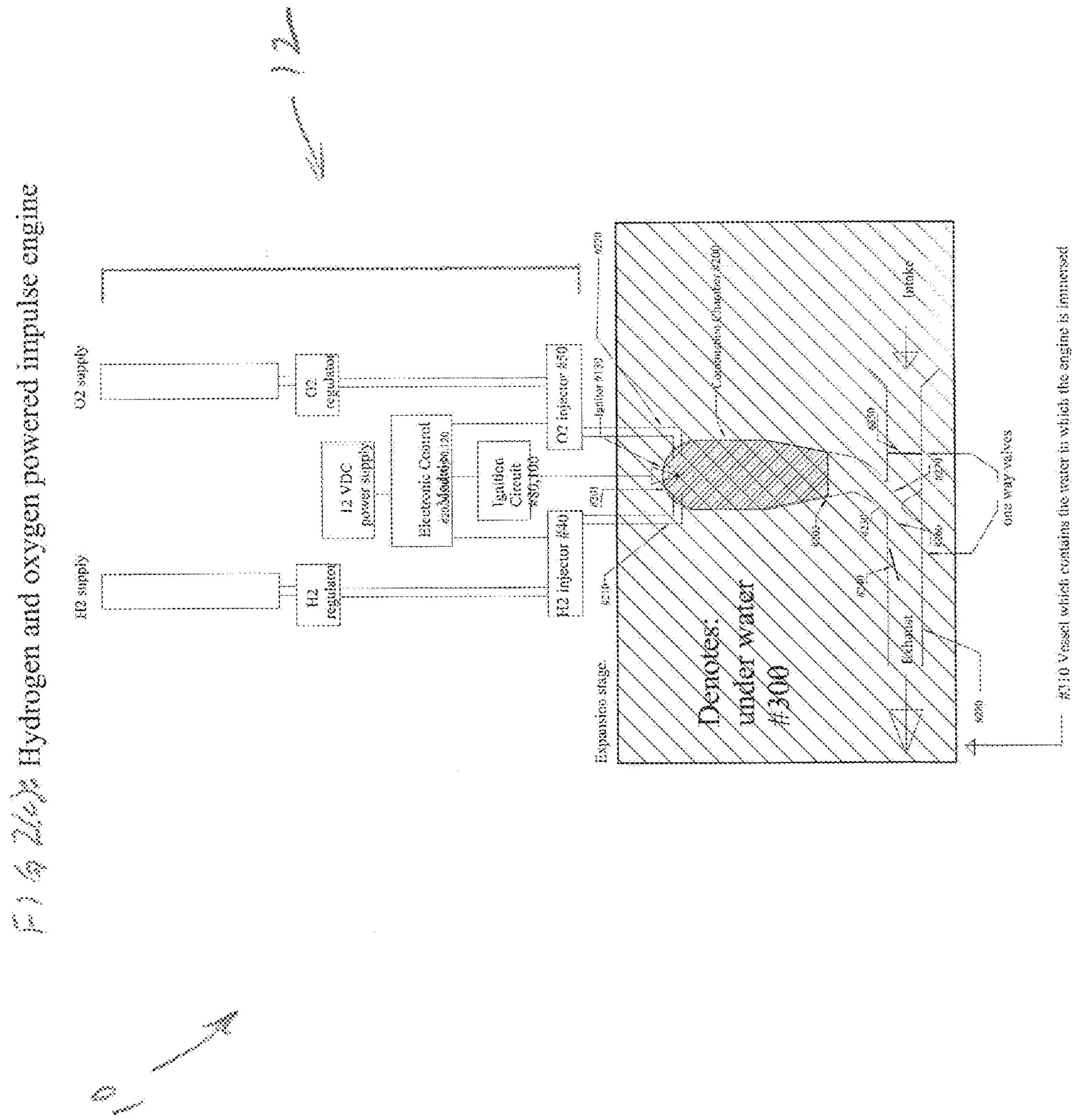
Hydrogen and oxygen powered impulse engine
H2 supply
O2 supply
H2 regulator
O2 regulator
12 VDC power supply
Electronic Control
Ignition Circuit
H2 injector #40
O2 injector #50
Intake
Exhaust
one way valves
Denotes: under water #300
Expansion stage
#310 Vessel which contains the water in which the engine is immersed Fig 2(d): Hydrogen and oxygen powered impulse engine
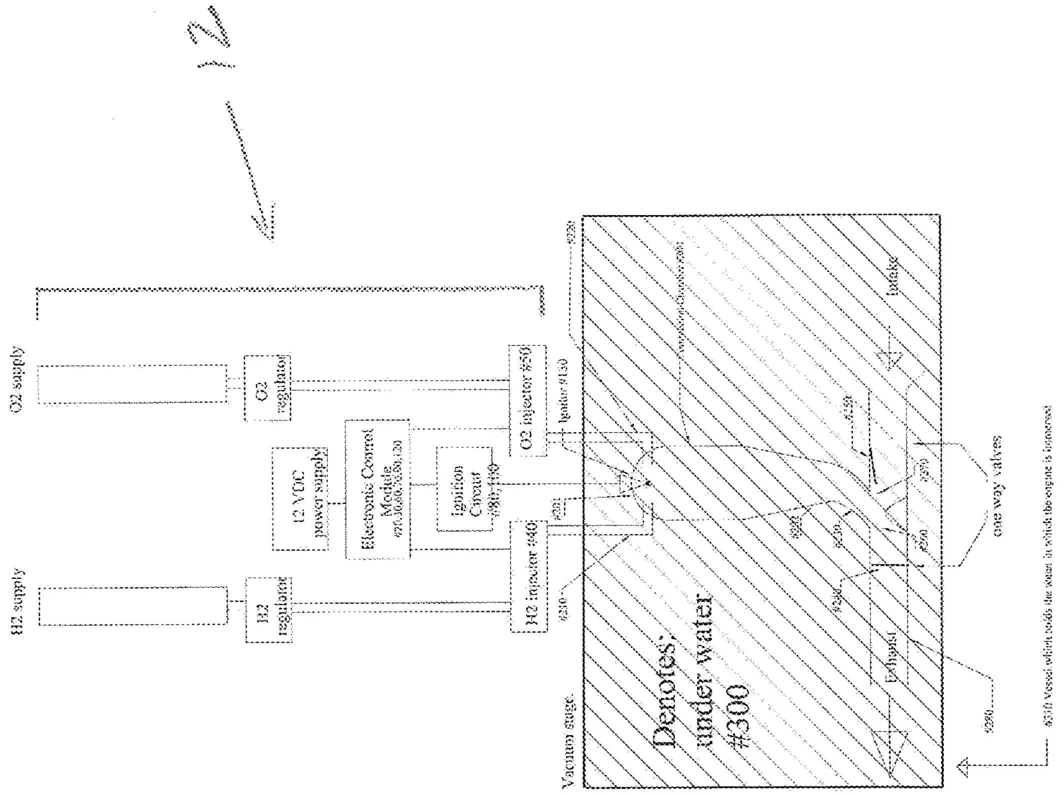

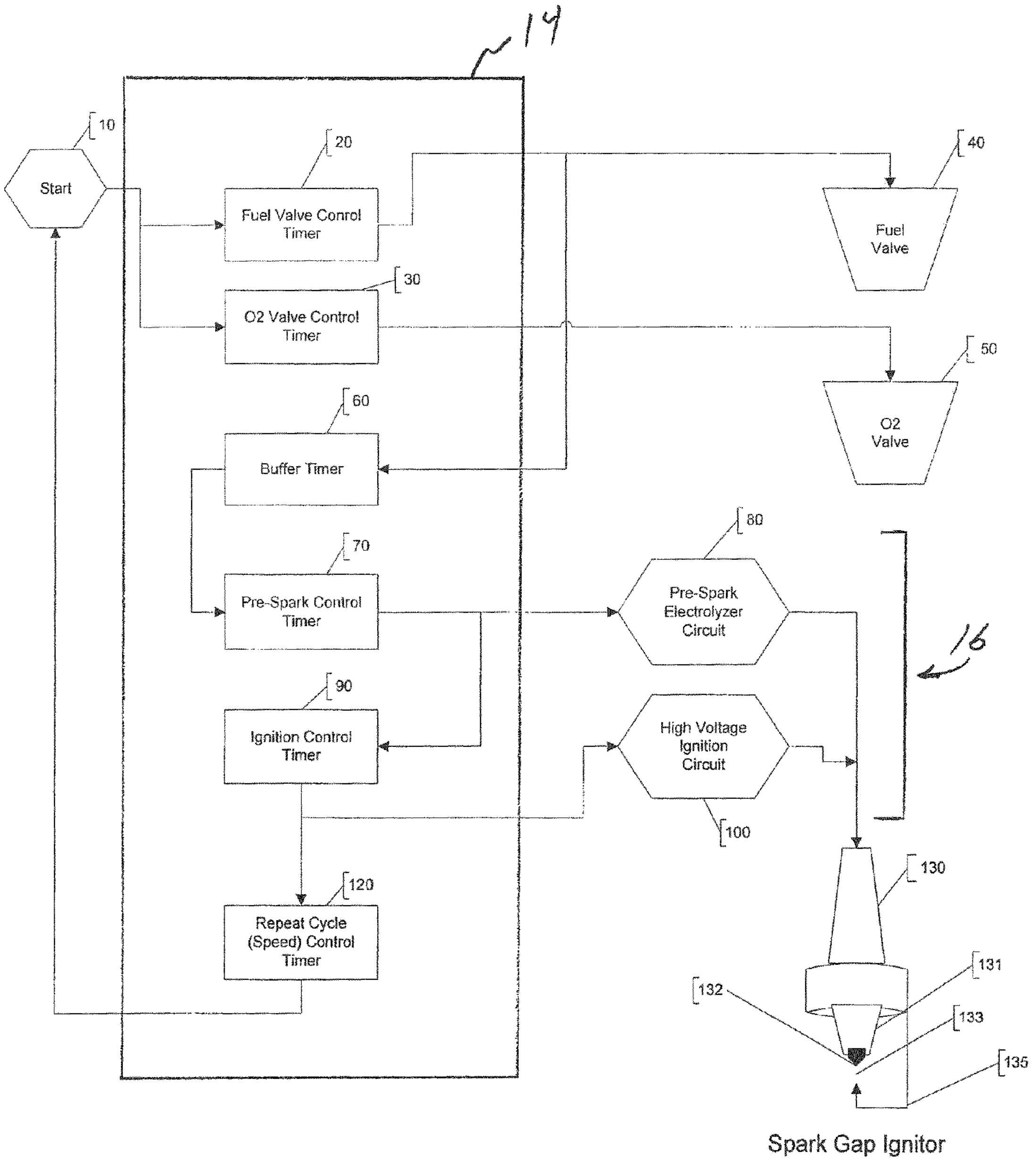
Figure 3: Underwater hydrogen and oxygen powered hydraulic impulse engine flowchart

UNDER WATER HYDROGEN AND OXYGEN POWERED HYDRAULIC IMPULSE ENGINE

CROSS-REFERENCE TO RELATED APPLICATION

This application claims benefit to provisional patent application Ser. No. 61/485,288, filed 12 May 2011, which is hereby incorporated by reference in its entirety.

BACKGROUND OF THE INVENTION

1. Field of the Invention

The present invention relates to a technique for pumping an aqueous fluid; and more particularly, the present invention relates to a method and apparatus for pumping water, including seawater. This invention also relates to a method and apparatus for making hot water for industrial, commercial and residential applications. This invention also relates to a method and apparatus of creating an engine which has only one cycle as compared to what is commonly known as a 2 or 4 cycle engine. This invention also relates to a method and apparatus which is capable of creating pressure waves within a fluid which may be utilized in other applications.

2. Brief Description of Related Art

By definition, an engine is a machine for converting thermal energy into mechanical energy to produce force and motion. The ability to move fluid in an upward vertical direction typically requires a mechanism known as a pump. Pumps are known in the art for pumping an aqueous fluid, including water. The majority of pumps are driven by either an engine, which are combustion based or a motor, which are powered by electricity. In all cases, pumps require an outside supply of energy to accomplish work. The majority of commercial mechanisms used to move fluid from one location to another location which is at a vertically higher than its current location is done through the use of pumps that operate on energy provided by the combustion of fossil fuels.

A significant percentage of the energy of used in this world is applied to moving fluids from one place to another. The energy required to accomplish this work can be replaced by other more abundant fuels. The method for accomplishing this work can be accomplished by utilizing an engine that is powered by hydrogen and oxygen.

In addition, creating hot water is commonly created by the combustion of fossil fuels and using the heat released to raise the temperature of the water. This method creates toxic emissions and carbon dioxide. Hot water can be created by other means, such as by renewable sources, but primarily it is accomplished by the use of fossil fuels.

In addition, most engines have pistons and they are typically known as either 2 cycle or 4 cycle engines which fundamentally perform in a similar fashion. Each has the ability to intake the fuel and air mixture (intake cycle), each has the ability to compress the fuel air mixture (compression cycle), each has the ability to transfer the energy released during the combustion reaction (power cycle), and each has the ability to remove the toxic emissions (exhaust cycle). It would be beneficial if the number of cycles and moving parts could be reduced.

In addition, imparting pressure upon a fluid results in a pressure wave being formed within the fluid. This pressure wave has certain characteristics that can be used to provide advantages in a number of applications. These pressure waves are typically created through the use of fossil fuels or via nuclear power plants. These methods have toxic and/or carbon dioxide emissions associated with them.

In view of this, there is a need in the industry to solve the aforementioned problem in the art.

SUMMARY OF THE INVENTION

The Apparatus, Such as an Underwater Hydrogen and Oxygen Powered Hydraulic Impulse Engine In summary, to solve the problems mentioned above, according to some embodiments, the present invention may be configured as, or take the form of, apparatus featuring an ignition system in combination with a combustion chamber which is immersed in water or some other appropriate fluid or medium that has the capability of removing heat from the combustion chamber.

According to some embodiments of the present invention, the ignition system may be configured to implement and repeat an ignition cycle by providing hydrogen and oxygen and also providing a control spark with a sufficient amount of energy for igniting a combustible mixture of hydrogen and oxygen.

According to some embodiments of the present invention, the combustion chamber may be configured to be immersed in an aqueous fluid, and also configured to fill with the same or other aqueous fluid, receive the hydrogen and oxygen therein so as to displace the aqueous fluid at its top and create a relatively dry pocket of the ignitable mixture of hydrogen and oxygen, receive a pre-spark electrical signal that removes excess moisture from the igniter, receive the control spark to ignite the combustible mixture of hydrogen and oxygen so as to cause a combustion reaction to occur and form steam that yields a specific amount of heat energy, that rapidly expands in volume and that results in a substantial increase in pressure on the aqueous fluid contained therein, provide the aqueous fluid from the combustion chamber in response to the substantial increase in pressure on the aqueous fluid contained therein, and transfers the heat energy from the reaction through the walls of the combustion chamber to the aqueous fluid in which it is immersed so as to cause a substantial temperature differential to occur rapidly which, induces a vacuum to be created therein and a difference in pressure inside and outside the combustion chamber, so that new aqueous fluid substantially re-fills the combustion chamber by way of the aqueous fluid entering the combustion chamber via the inlet valve based on the difference in pressure, and the ignition system can implement and repeat a new ignition cycle.

According to some embodiments, the present invention may be configured as, or take the form of, an Underwater Hydrogen and Oxygen Powered Hydraulic Impulse Engine According to some embodiments, the present invention may include one or more of the following addition features:

An electronic control module that may be configured to provide a hydrogen injector control signal, an oxygen injector control signal, and an ignition circuit control signal for electronically controlling the provisioning of the hydrogen, oxygen and the pre-ignition electrical signal and control spark into the combustion chamber.

The ignition system may also include a hydrogen injector configured to receive the hydrogen injector control signal and provide the hydrogen to the combustion chamber; an oxygen injector configured to receive the oxygen injector control signal and provide the oxygen to the combustion chamber; an ignition circuit configured to receive the ignition circuit control signal, a pre-ignition control signal and provide an ignition signal; and an igniter configured to respond to the ignition signal and ignite the combustible mixture of hydrogen and oxygen. The hydrogen injector and oxygen injector may be configured to provide the hydrogen and oxygen with suitable pressure and concentration so as to fill an upper portion of the combustion chamber so as to allow the control spark to ignite the combustible mixture of hydrogen and oxygen inside the combustion chamber.

The ignition system may also include a hydrogen regulator configured to provide the hydrogen from a hydrogen supply to the combustion chamber; and an oxygen regulator configured to provide the oxygen from an oxygen supply to the combustion chamber.

The ignition system may also feature a hydrogen injector configured to provide the hydrogen to the combustion chamber; an oxygen injector configured to provide the oxygen to the combustion chamber; an ignition circuit configured to provide a pre-ignition signal, an ignition signal; and an igniter configured to respond to the ignition signal and ignite the combustible mixture of hydrogen and oxygen.

The ignition system may also feature a pre-spark electrolyser circuit configured to respond to a pre-spark control timer signal, and to provide a pre-spark electrolyser circuit signal to energize the pre-spark electrolyser circuit by applying a voltage across a spark gap of the igniter to disperse the aqueous fluid on either a spark gap insulator or across spark gap electrodes which, if present, would inhibit an ignition spark.

The ignition system may also include a pre spark control timer configured to provide the pre spark control timer signal to the pre-spark electrolyser circuit.

The ignition circuit may be a high voltage ignition circuit configured to provide a high voltage to ignite the combustible mixture of hydrogen and oxygen inside the combustion chamber.

The pre-spark electrolyser circuit may be configured either to electrically heat the aqueous fluid or to break apart the aqueous fluid via electrolysis, so as to enable an ignition process to occur in a wet environment.

The ignition system may be configured to provide the combustible mixture of hydrogen and oxygen, simultaneously or to provide separately hydrogen and oxygen that forms the combustible mixture inside the combustion chamber.

The combustion chamber may take the form of a vessel having an outer wall configured to receive the aqueous fluid based on a difference in pressure of the aqueous fluid inside and outside the combustion chamber.

The combustion chamber may include an intake check valve configured to receive the aqueous fluid and substantially fill the combustion chamber based on the difference in pressure.

The combustion chamber may include an exhaust check valve configured to provide the aqueous fluid from the combustion chamber to exit the combustion chamber in response to the substantial increase in pressure which is imparted on the aqueous fluid inside the vessel during the combustion reaction.

The outer wall of the combustion chamber may be configured to transfer the heat energy from the combustion reaction within the combustion chamber to the aqueous fluid in which the combustion chamber is immersed.

The combustion chamber may include an intake check valve configured to respond to a vacuum effect in the combustion chamber caused by the provisioning of the aqueous fluid from the combustion chamber via the an exhaust port and refill the combustion chamber with the new aqueous fluid.

A vessel which is capable of holding an sufficient amount of water or other aqueous fluid in which the combustion chamber is immersed.

A manifold which is capable of being connected to the combustion chamber and which is also immersed in the water or other aqueous fluid.

A fitting of suitable material which connects the combustion chamber to the manifold.

A hydrogen tube and an oxygen tube, that is attached to the combustion chamber in such a manner as to direct the hydrogen and oxygen gases onto the igniter in the area of the spark gap so as to assist in the removal of water or other aqueous fluid from the surface of the igniter.

The Method

The present invention may also take the form of a method, e.g. including steps (or modules), for performing the following:

providing a combustion chamber configured to be immersed in an aqueous fluid and to fill with the same or other aqueous fluid, providing a delivery system for the hydrogen and oxygen into the combustion chamber so as to displace the aqueous fluid at its top and create a relatively dry pocket of an ignitable mixture of hydrogen and oxygen, providing a pre spark signal of electricity of sufficient strength to assist with the removal of liquid from the igniter so as to allow the igniter to provide the spark required for ignition, providing a control spark with a sufficient amount of energy to ignite the combustible mixture of hydrogen and oxygen so as to cause a combustion reaction and form steam that yields a significant amount of heat energy, that rapidly expands in volume and that results in a substantial increase in pressure on the aqueous fluid contained therein, so that the aqueous fluid is provided from the combustion chamber in response to the substantial increase in pressure on the aqueous fluid contained therein, the heat energy from the reaction is transferred through the walls of the combustion chamber to the aqueous fluid in which it is immersed so as to cause a substantial temperature differential to occur thereby creating a vacuum therein and a difference in pressure inside and the inlet portion of the apparatus, so that the combustion chamber is substantially refilled with new aqueous fluid based on the difference in pressure, and a new ignition cycle is implemented and repeated by the ignition system by providing new hydrogen and oxygen and a new control spark.

In effect, the present invention moves the aqueous fluids, such as water, in a dramatically different fashion and without any carbon emissions than previous devices by taking advantage of the chemical energy that is stored in hydrogen and the natural proclivity of the water vapor, which is created when combusted with the appropriate amount of oxygen, to condense into liquid water when it is cooled. When the appropriate amount of hydrogen and oxygen are combined and subsequently ignited inside a vessel, that has an opening on one end, which is submerged under water, or other aqueous fluid, which may be contained in another larger vessel of the appropriate size, the combustion reaction releases energy in the form of heat rapidly. The rise in temperature expands the resultant water vapor about 7-13 times the original volume of the original hydrogen and oxygen gases, thereby applying an explosive force to move the water out of the chamber via the outlet port. Because the chamber is underwater the resultant water vapor cools rapidly and the water vapor (steam), reduces its volume by natural means and condenses into liquid water, thereby creating a vacuum to refill the original chamber with water again, so the cycle can be repeated.

In operation, the combustion portion of the present invention may be configured to work underwater consistent with the following features and/or advantages:

1. Water or other aqueous fluid may be used as a cooling component to improve the efficiency and effectiveness of the present invention.

2. The water or other aqueous based solution may be used as a working fluid.

3. Improved noise attenuation, since the water or other aqueous fluid is a medium which provides excellent sound dampening qualities.

4 Improves safety, by submerging under water or other aqueous fluid, it greatly reduces the risk of damage from catastrophic failure of combustion components.

5. By cooling the combustion chamber, by having it submerged under water, a relatively large vacuum is created and the water, or other working fluid, is forced to enter the combustion chamber without the use of additional energy.

According to some embodiments, the present invention may be configured as, or take the form of, an impulse engine due to the fact that the forces occur over a very short time period which is a result of the rapid speed of the reactions.

According to some embodiments of the present invention, the engine may be configured so that there are substantially no undesirable emissions, such as fossil fuel emissions or carbon dioxide.

According to some embodiments of the present invention, the apparatus or engine may be configured as, and considered to be, a one stroke engine as compared to a 2 or 4 stroke engine, based on the fact that the intake and compression stroke occurs as a natural result of the power and exhaust stroke.

According to some embodiments of the present invention, the apparatus or engine may be configured so that substantially no additional lubrication is required.

According to some embodiments of the present invention, the apparatus or engine may be configured as a co-gen system producing heat and force simultaneously, including applications where the force or heat may be used to generate electricity.

According to some embodiments of the present invention, the apparatus or engine may be configured to produce a pressure wave that travels through the working fluid at a speed at least as fast as the speed of sound in that working fluid which can be utilized in a variety of desirable applications.

According to some embodiments of the present invention, the apparatus or engine may be configured with no pistons, but rather uses the incompressible aqueous fluid as a hydraulic ram to effect the movement of the aqueous fluid.

According to some embodiments of the present invention, the apparatus or engine may be configured with no impellor.

According to some embodiments of the present invention, the apparatus or engine may be configured only with valves.

According to some embodiments of the present invention, the apparatus or engine may be configured only with one valve.

According to some embodiments of the present invention, the apparatus or engine may be configured with no valves.

According to some embodiments of the present invention, the apparatus or engine may be configured with valves that have no moving parts.

BRIEF DESCRIPTION OF THE DRAWING

The drawing includes the following Figures, not necessarily drawn to scale:

FIG. 2(*b*) shows a diagram of apparatus, including an underwater hydrogen and oxygen powered impulse engine, according to some embodiments of the present invention, in which the combustion chamber which resides in another vessel that is capable of holding water or other fluid, which is substantially filled with aqueous fluid, is provided hydrogen and oxygen therein so as to displace the aqueous fluid at its top and create a relatively dry pocket of the combustible mixture of hydrogen and oxygen.

FIG. 2(*c*) shows a diagram of apparatus, including an underwater hydrogen and oxygen powered impulse engine, according to some embodiments of the present invention, in which the combustion chamber, which resides in another vessel that is capable of holding water or other fluid, receives the pre-ignition control signal and the control spark to ignite the combustible mixture of hydrogen and oxygen so as to cause a combustion reaction and form steam that yields a significant amount of heat energy, that rapidly expands in volume and that results in a substantial increase in pressure on the aqueous fluid contained therein, and provides the aqueous fluid from the combustion chamber to the outlet port in response to the substantial increase in pressure on the aqueous fluid contained therein.

FIG. 2(*d*) shows a diagram of apparatus, including a hydrogen and oxygen powered impulse engine, according to some embodiments of the present invention, in which the combustion chamber, which resides in another vessel which is capable of holding water or other fluid has transferred the heat energy from the reaction through the walls of the combustion chamber to the aqueous fluid in which it is immersed so as to cause a substantial temperature differential to occur rapidly between the heat that was created within the combustion chamber during the combustion and the fluid in which the combustion chamber is immersed creating a vacuum therein and a difference in pressure inside the combustion chamber and the inlet port so that new aqueous fluid substantially re-fills the combustion chamber based on the difference in pressure, and the ignition system can implement and repeat a new ignition cycle.

FIG. 3 shows a block diagram of a flowchart, including steps (or modules) for operating the hydrogen powered impulse engine, according to some embodiments of the present invention.

DETAILED DESCRIPTION OF THE INVENTION

Figure 1:
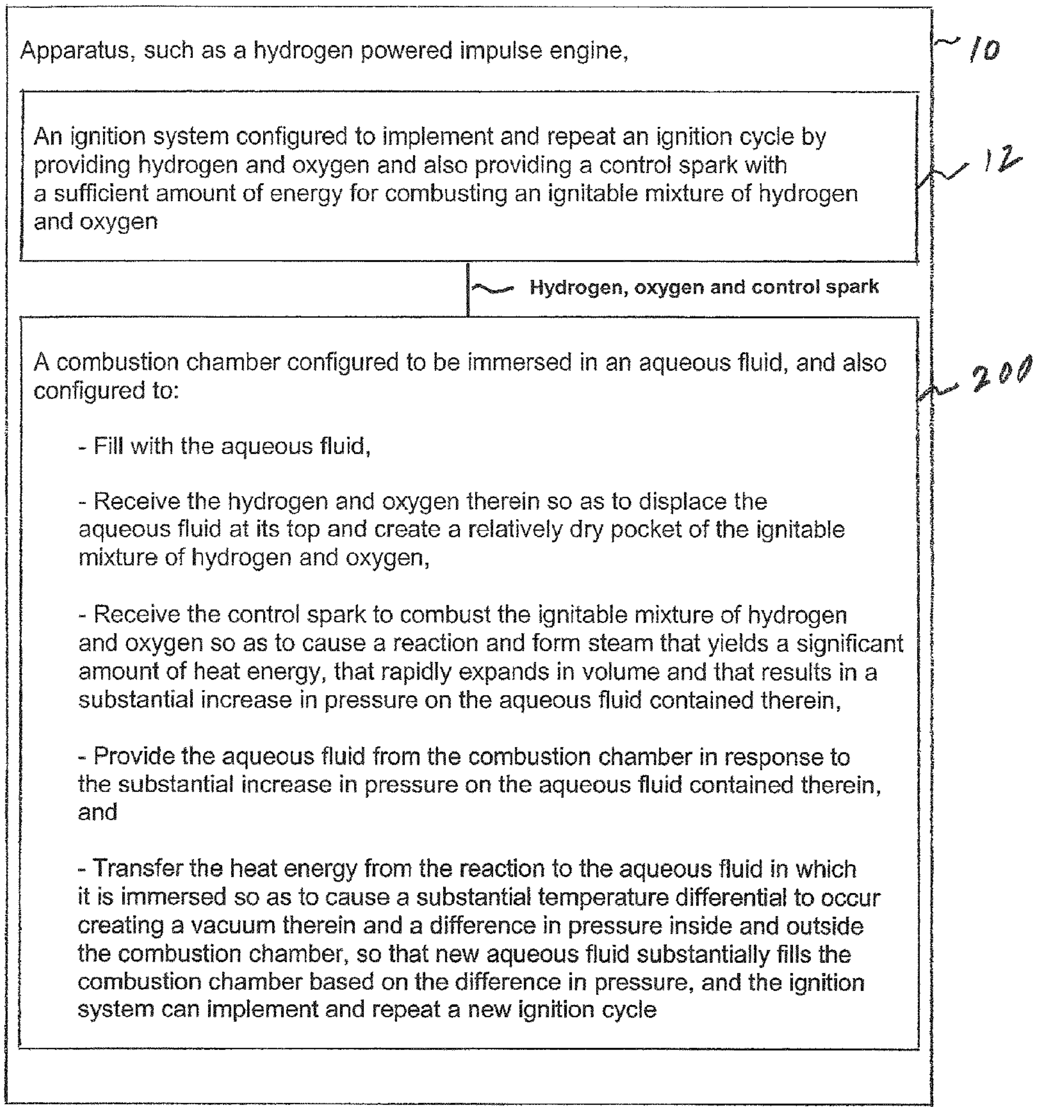
FIG. 1 shows a block diagram of apparatus, including a hydrogen and oxygen powered impulse engine, according to some embodiments of the present invention.

FIGS. 1, 2*a* and 2*d*: Apparatus

FIGS. 1 and 2*a* through 2*d* show, by way of example, the present invention in the form of apparatus generally indicated as 10, including an ignition system generally indicated as 12 and a combustion chamber generally indicated as 200, which resides in water or other aqueous heat conducting fluid indicated as 300. This fluid 300 is contained inside a vessel indicated as 310. The basic components of the apparatus, according to some embodiments of the present invention, operate as follows.

As shown, the combustion chamber 200, also known herein as a cylindrical vessel, of an appropriate shape and size 200 is submerged under aqueous fluid, e.g., water, 300 vertically upside down as shown in FIGS. 2*a* to 2*d*. This upper end of the vessel 200 is closed with a hemisphere 201 on one end. This hemisphere 201 has been modified and configured to accept an inlet of hydrogen 210, an inlet of oxygen 220 and a means to create a spark 130 (see FIG. 2*a*). The other end 202 of the combustion chamber 200 is open and may be of reduced diameter and has been attached to, e.g., a "WYE" fitting 230, or some other design/configuration that enhances the performance of the apparatus. On each side of the fitting 230 is a one way valve. One valve is configured on the exhaust side 240 and the other valve is configured on the inlet side 250. The components identified as 200, 201, 202, 210, 220, 230, 240, 250, 260, 270 are all connected to what is commonly referred to as a manifold 280 which allows multiple combustion chambers 200, 201, 202, 210, 220, 230, 240, 250, 260, 270 to be connected in series or parallel so as to modify the performance of the device or apparatus 10. The manifold 280 may be of a different size than the combustion chamber 200, 201, 202, 210, 220, 230, 240, 250, 260, 270. This manifold 280 and combustion chamber 200, 201, 202, 210, 220, 230, 240, 250, 260, 270 may be placed inside another vessel 310, which is capable of holding sufficient water or other fluid to cool the combustion chamber.

The present device or apparatus may be configured to use standard valves, 240, 250, commonly known swing check valves that may be arranged to take advantage of gravity so each valve 240, 250 may be seated when in the vertical position. The valves 240, 250 may be configured to be free to react to the forces applied to them. Each valve 240, 250 may be positioned so they operate in the same direction, generally moving the water or other working fluid from the intake side to the exhaust side. By using swing check valves by no means eliminates the use of other types or kinds of check valves to perform the specific task, and the scope of the invention is intended to include using other types or kinds of valves and check valves, either now known or later developed in the future.

The basic principle of operation is as follows:

Initially, as shown in FIG. 2*a*, the combustion chamber or vessel 200 is completely filled with water or other appropriate aqueous based fluid and submerged in water or other heat conducting fluid.

Figure 2B:
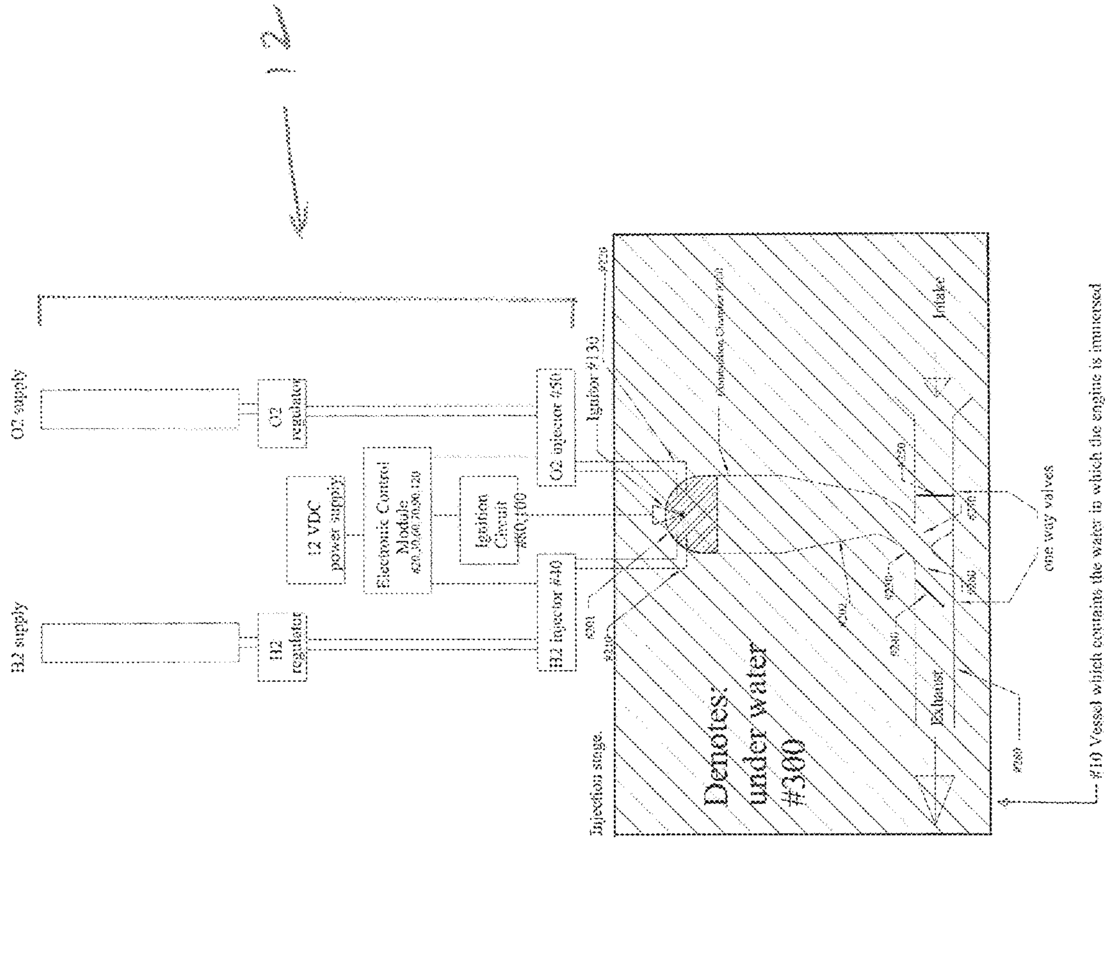
FIG. 2(*a*) shows a diagram of apparatus, including an underwater hydrogen and oxygen powered impulse engine, according to some embodiments of the present invention, in which a combustion chamber is substantially filled with aqueous fluid and resides in another vessel which is capable of holding water or other fluid.

As shown in FIG. 2*b*, an appropriate amount of hydrogen is injected via a hydrogen injector 40 and 210 into the combustion chamber or vessel 200 in such a manner as to impinge upon the igniter 130 in the area of 133 via an electronic control module 14, which includes elements or components 20, 30, 60, 70, 90, 120 shown in FIG. 3, that implements a timed valve system. Simultaneously, or in series, an appropriate amount of oxygen is also injected into the combustion chamber or vessel 200 via a similar oxygen injector 50 and 220 in such a manner as to impinge upon the igniter 130 in the area of 133, which is controlled by the electronic control module 20, 30, 60, 70, 90, 120 that implements the same timed valve system. The amount of gases injected in the area 133 is determined to be, and should be, sufficient to provide a stoichiometric ratio of hydrogen and oxygen, as a person skilled in the art would appreciate. The hydrogen injector 40 and the oxygen injector 50 are configured so that these gaseous fluids will impinge on the area of the spark gap on the igniter and by nature, be injected so as to displace the liquid water at the top 201 of the combustion chamber or vessel 200, and create a relatively dry pocket of a stoichiometric mixture of fuel and oxidant hydrogen and oxygen, as shown in FIG. 2*b*. This injection action may force water or other aqueous based working fluid out through the bottom of the combustion chamber or vessel 200 through the other end 202, out through exhaust port 260 and may force open exhaust valve 240. Any amount of displaced fluid exiting the chamber 200, 202 and 230 which impinges upon the inlet port 270 will in this configuration cause the inlet valve 250 to close, e.g., as also shown in FIG. 2*b*.

As shown in FIG. 2*c*, once the desired amount of hydrogen and oxygen gases have entered the combustion chamber or vessel 200, the injection valves 40, 50 are closed and an ignition occurs using specialized equipment or components that includes in combination the electronic control module 20, 30, 60, 70, 90, 120, 130 and an ignition circuit 16, which includes elements or components 80, 100 shown in FIG. 3, to create a spark with the appropriate amount of energy to ignite the hydrogen and oxygen mixture inside the combustion chamber 200, as a person skilled in the art would appreciate.

When the ignition event occurs, the combustible mixture of hydrogen and oxygen combine to form water molecules, also known as steam, and the reaction yields a significant and specific amount of heat energy which according to well-known scientific principles, rapidly expands in volume and since the reaction occurs inside an enclosed or substantially enclosed combustion chamber or vessel 200, it results in a substantial increase in pressure upon the all of the materials in communication with the original gases. Since the combustion chamber or vessel 200 and related components 201, 210, 220, 230, 250, are resistive to the forces of expansion impinging upon it, the resultant pressure of the expanding gases which were in contact with the surface of the water, or other aqueous based fluid, force the water or other aqueous based solution out of the opening 202 in the bottom of the combustion chamber or vessel 200 and through the exhaust port 260 and exhaust valve 240 and into the manifold 280. These expanding gases which act upon the aqueous based fluid that may desire to exit the chamber 200 and 202 through inlet port 270 force the inlet valve 250 closed. This action forces the water or other aqueous fluid out the exhaust valve 240 The amount of water or aqueous based fluid moved at this instant is dependent upon factors such as pressure, volume of gases, temperatures, etc., as a person skilled in the art would appreciate.

As shown in FIG. 2*d*, once the combustion reaction has occurred, the present invention takes advantage of another natural property of the water vapor or steam produced by the combustion reaction.

It is known that the volume of steam and pressure produced are directly related to the amount of hydrogen and oxygen injected in the chamber 200, the temperature achieved during the reaction and the size, shape and material of the combustion chamber or vessel 200. Basic physics support the fact that any release of energy must be converted into either force or heat as a person skilled in the art would appreciate. Due to the fact that the combustion chamber or vessel 200 is under water 300, there is a significant ability for the heat portion of the reaction to be transferred very rapidly through the walls of the combustion chamber or vessel 200 to the surrounding water 300. This ability to transfer the heat portion of the reaction is a significant advantage according to some embodiments of the present invention. It is also known, based upon fundamental principals of science, that any amount of cooling that occurs within the combustion chamber or vessel 200 will reduce the volume of the steam from its maximum to whatever the temperature of the surrounding environment and therefore, create a relative vacuum (lower pressure) rapidly within the combustion chamber or vessel 200. The amount of vacuum can be calculated and therefore controlled, quite accurately if the temperatures, volumes and relative pressures are known. According to some embodiments of the present invention, the mechanical portion of the engine, because the combustion chamber or vessel and related components, e.g. elements 200 through 280, is submerged under water 300, the heat of the reaction is transferred very rapidly through the walls of the vessel to the water or other fluid surrounding it, thereby allowing a large temperature differential to occur rapidly and the result is a vacuum (low pressure) being created rapidly inside the combustion chamber 200, 201, 202, 230, 260, 270.

When this portion of the reaction is initiated, the one way valve on the exhaust side 240 of the engine or apparatus 10 closes, and the one way valve on the inlet 250 opens. The vacuum creates another pressure differential on the water or, other working fluid, on the inlet side 270 of the engine and thus fresh cooler water or other aqueous based fluid is forced into the combustion chamber or vessel 200 via 280, 270, 230, 202 until it is substantially full again. Any water or other aqueous based fluid, that enters the inlet side of the engine (see reference label 270) but exceeds the available volume of the combustion chamber or vessel 200, may be forced to continue moving through the exhaust valve 240 and into the manifold 280. This act of refilling the combustion chamber constitutes a significant advantage of this invention because, it cools the combustion chamber, without using any additional energy, which also helps to maintain or enhance the desired material characteristics of the chamber 200.

At the end of that portion of the cycle, the engine or apparatus 10 is at a state of relative rest and the cycle is free to be repeated, see FIG. 2*a*. The combustion chamber or vessel 200 can be configured to modify the explosive characteristics of the hydrogen and oxygen mixture.

According to some embodiments of the present invention, the combustion chamber or vessel 200 may be configured or modified to focus the force of the reaction toward the opening 202 of the combustion chamber or vessel 200.

According to some embodiments of the present invention, the combustion chamber or vessel 200 may be configured or modified to limit or restrict the amount of water or other aqueous based fluid re-entering the combustion chamber or vessel 200 after the initial ignition occurs.

According to some embodiments of the present invention, the combustion chamber or vessel 200 may be configured or modified to maximize the heat transfer to the surrounding water 300.

According to some embodiments of the present invention, the combustion chamber or vessel 200 may be configured or modified to enhance the amount of fluid being provided toward the opening 202 of the combustion chamber or vessel 200.

According to some embodiments of the present invention, the electronic control module (see element 14) system comprised of elements 20, 30, 40, 50 can be modified to control the temperature of the combustion reaction inside chamber 200.

FIGS. 1 and 2*a* to 2*d*: List of Component Parts

By way of example, the following is a list of components of that shown in FIGS. 1 and 2*a* to 2*d:*

Power supply 12 volts. Maybe powered by, e.g., an electrical sub system (not shown).

Hydrogen adequate supply

Oxygen adequate supply

Regulators part of the system

Controller 20, 30, 60, 70, 90, 120 (see FIG. 3)

H2 Injector—40

O2 injector—50

Ignition Circuit—80, 100, 130

Combustion Chamber 200

Hemisphere 201

H2 inlet 210

O2 inlet 220

Open end 202

Wye fitting 230—(by way of example, many variations

Exhaust valve 240—(not constrained to swing check valve. May not even be necessary in future)

Inlet valve 250—(not constrained to swing check valve, May not even be necessary in future)

Exhaust port 260

Intake port 270

Manifold 280

Water 300 (used to remove heat from combustion

Vessel 310 which holds water or other aqueous fluid in which the apparatus is immersed Working fluid: Aqueous fluid, slurry, etc.

FIG. 3: The Flowchart and the Pre-Spark Ignition Process

FIG. 3 shows a block diagram of a flowchart, including steps or modules for operating the hydrogen and oxygen powered impulse engine, according to some embodiments of the present invention, which includes the following steps or modules:

10: Start of process.

20: Fuel Valve Control Timer. A timer to control the "open" time of the Fuel Valve 40.

30: O2 (Oxygen) Valve Control Timer. A timer to control the "open" time of the oxygen valve 50.

40: Fuel Valve. An electromechanical valve controlling fuel to the combustion chamber

50: Oxygen Valve. An electromechanical valve controlling O2 supply to the combustion chamber.

60: Buffer Timer. A timer to allow valves to close before firing of the ignition system.

70: Pre-Spark Control Timer. A timer to control the amount of time that the pre-spark electrolyzer circuit is energized.

80: Pre-Spark Electrolyzer Circuit, A circuit to apply a voltage across the spark gap of the igniter.

90: Ignition Control Timer. A timer to control the delivery of the spark.

100: High Voltage Ignition Circuit. A circuit that supplies a high Voltage pulse to the spark gap igniter.

120: Repeat Cycle Control Timer. A timer that controls the time between ignition cycles.

130: Spark Gap Igniter. A device that utilizes a spark across an electrode gap to ignite the fuel mixture.

One skilled in the art would appreciate that typical spark plug igniters used in internal combustion engines may be configured to operate in a low moisture environment.

The underwater hydrogen and oxygen powered hydraulic impulse engine or apparatus 10 exposes an igniter 130 to moisture from two (2) sources. The first source is water produced by the combustion of hydrogen and oxygen during the operation of the device. The second source of water is the water content of the working fluid within the combustion chamber 200.

With a typical high voltage ignition system (i.e. such as in an automobile), moisture on an insulator 131 of the spark plug igniter device 130 will create a path to ground 135 attenuating or eliminating the desired ignition spark and detrimentally affecting the ignition of the fuel mixture. Furthermore, droplets of water bridging a high voltage electrode 132 of a spark gap 133 on the igniter 130 also creates a path for the high voltage to the ground 135 without producing the desired spark required for ignition of the hydrogen and oxygen mixture.

The Pre-Spark Ignition Process as a Solution to the Problem

According to some embodiments of the present invention, the ignition system 12 (see also FIGS. 2*a*-2*d*), e.g., including elements 70, 80, 90, 100, 130 shown in FIG. 3, is configured to utilize a unique approach to overcome the aforementioned problems of techniques known in the art. By way of example, the ignition system 12 utilizes a pre spark control timer 70 to energize a pre-spark electrolyser circuit 80 to apply a voltage across the spark gap 133 of the igniter 130, causing a dispersion of the liquid water (or fluid) on the spark gap insulator 131 or across the spark gap electrodes 132, 135, which if present would inhibit the ignition spark. The pre-spark circuit 80 may be configured to utilize, two different types of methods of dispersing the liquid water. The first method can involve electrically heating the water which results in the water being evaporated. The second method can involve breaking apart the water via electrolysis. These methods enable the ignition process to occur in a wet environment. An additional benefit of the electrolysis circuit is enhancement of the ignition process which creates additional hydrogen and oxygen that can benefit the performance of this device.

The Circuits or Modules in the Ignition System 12

By way of example, the functionality of the circuits or modules set forth herein, including the circuits or modules described in relation to FIGS. 1, 2*a* to 2*d* and 3, may be implemented using hardware, software, firmware, or a combination thereof. In a typical software implementation, the circuits or modules may include, e.g., one or more microprocessor-based architectures having, e.g., at least one processor or microprocessor, random access memory (RAM) and/or read only memory (ROM), input/output devices and control, data and address buses connecting the same as shown. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of one or more processors as a stand-alone processor or processor module, as separate processor or processor modules, as well as some combination thereof.

List of Some Possible Applications

The scope of the invention is not intended to be limited to any particular type or kind of application either now known or later developed in the future. By way of example, at least the following types or kinds of applications are envisioned:

The water or other-aqueous fluid in which the engine is immersed will also be used to take the excess heat away and which may be used in other applications.

This engine could be used to produce electricity via a standard water turbine.

This engine could be used to provide hydraulic lift capabilities.

This engine could be used to provide heat and movement within a hot tub.

This engine can be used to create electricity by pumping a magneto hydraulic fluid.

This invention could be used to propel water craft.

This invention could be used to move water.

This invention could be used to in water distribution systems.

This invention could be used in waste water distribution facilities.

This invention could be used to purify water.

This invention could be used to move electrolytic solutions.

This invention could be used to move hydraulic based equipment.

This invention could be used to heat water.

This invention could be used as a component of a cooling system.

List of Some Possible Industries

The scope of the invention is not intended to be limited to any particular type or kind of industry in which the present invention may be applied, including industries either now known or later developed in the future. By way of example, at least the following types or kinds of industries are envisioned:

1. The Food Industry, including applications related to corn processing, mixing, sterilization, waste removal, fats and oils, aquaculture, aquaponics and stock yards.
2. The Irrigation Industry, including applications related to organic farms cattle, pigs, chicken, lawn watering and farms.
3. The Heating Industry, including applications related to providing hot water for the residential, commercial and industrial segments
4. The Cooling Industry, including applications related to compressors, refrigeration and air conditioning.
5. The Water Distribution Industry, including applications related to residential, commercial, industrial, municipal water, hydro electricity, pumped water storage and evacuation pumps.
6. The Water Cleaning Industry, including applications related to desalination, grey water purification.
7. The Steam Industry, including applications related to dry steam, electricity production, humidification system control, flash steam and boilers.
8. The Electrolysis Industry, including applications related to improvement in production of hydrogen and oxygen by adding heat, water and movement to the system.
9. The Plating Industry, including applications related to adding heat and water and additional agitation to the solution.
10. The Energy generation Industry, including applications related to available of energy on demand, throttled demand, use energy only when needed
11. The Water Fountain Industry, including ornamental and other useful applications.
12. The Hydraulic Motor Industry, including applications related to hydraulic motors are used for many applications now such as winches and crane drives, wheel motors for military vehicles, self-driven cranes, and excavators. Conveyor and feeder drives, mixer and agitator drives, roll mills, drum drives for digesters, trommels and kilns, shredders for cars, tires, cable, general garbage, drilling rigs and trench cutters.
13. Industries Related to Laser cooling or hologram production.
14. The Milk Processing Industry.
15. The Beer processing industry.

16. The Medical Industry.

17. The Water industry.

18. Other industries related to the bio sciences, hydronic heating systems, petro chemicals, hot tubs, hot water heater, transportation, water drive, pressure washers, heat pumps, absorption chillers, pools, hospital clean steam generation, library and museum clean steam generation, humidification systems, wash down stations in food and chemical plants, internal pipe cleaning in food processing plants, snow melt systems, preheat and reheat coil pumps, sewage treatment pumps, concrete processing pumps, cleaning of vats, sump pump and sewage ejection systems pumps, cooling tower feed pumps, condensate return pumps, condensate liquid movers, geo thermal pumps, water injection for mining, desuperheating injection for steam applications, ship based firefighting pumps (example municipal fire boats), hydraulic strip mining pumps, swimming pool filtration, well pumps, snow making machines, bilge pumps, transfer pumps, fracking pumps (i.e.: for natural gas wells or environmental cleanup such as at old gas stations), swimming pool pumps, basement sump pumps, watercraft propulsion, laundry, washing machines, dishwasher pump (residential, and commercial, and industrial), nuclear power plant cooling pumps, fish farms & hatcheries, and water cutters (i.e. high pressure concrete & stone cutters).

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. Apparatus, including an underwater hydrogen and oxygen powered impulse engine, comprising:

- a programmable ignition system configured to implement and repeat an ignition cycle by providing hydrogen and oxygen into a combustion chamber, provide a pre-ignition energy to the igniter and also providing a control spark with a sufficient amount of energy for igniting a combustible mixture of hydrogen and oxygen; and
- a combustion chamber configured to be submerged in a surrounding aqueous fluid externally surrounding the combustion chamber, and also configured to:
  - fill with a chamber aqueous fluid;
  - receive the hydrogen and oxygen therein so as to displace the chamber aqueous fluid at the top of the combustion chamber and create a relatively dry pocket of the ignitable mixture of hydrogen and oxygen;
  - receive energy from a pre-spark electrolyser circuit to remove moisture from the igniter;
  - receive the control spark to ignite the combustible mixture of hydrogen and oxygen so as to cause a combustion reaction and form steam that yields a specific amount of heat energy, that rapidly expands in volume due to the rapid increase in temperature and that results in a substantial increase in pressure on the chamber aqueous fluid contained therein,
  - provide the chamber aqueous fluid from the combustion chamber to the exhaust valve in response to the substantial increase in pressure on the chamber aqueous fluid contained therein, and
  - transfer the heat energy from the reaction to the surrounding aqueous fluid in which it is submerged so as to cause a temperature differential to occur, thereby creating a vacuum therein and a difference in pressure inside the combustion chamber and the inlet valve, so that new chamber aqueous fluid can enter the combustion chamber via the net valve and substantially re-fills the combustion chamber based on the difference in pressure, and the ignition system can implement and repeat a new ignition cycle.

2. Apparatus according to claim 1, wherein the ignition system further comprises:

- an electronic control module configured to provide a hydrogen injector control signal, an oxygen injector control signal, and an ignition circuit control signal for electronically controlling the provisioning of the hydrogen and oxygen, the pre-ignition energy circuit and the control spark into the combustion chamber.

3. Apparatus according to claim 2, wherein the ignition system further comprises:

- a hydrogen injector configured to receive the hydrogen injector control signal and provide the hydrogen to the combustion chamber;
- an oxygen injector configured to receive the oxygen injector control signal and provide the oxygen to the combustion chamber;
- a pre-spark electrolyser circuit configured to enhance the ignition within the combustion chamber
- an ignition circuit configured to receive the ignition circuit control signal and provide an ignition signal; and
- an igniter configured to respond to the ignition signal and ignite the combustible mixture of hydrogen and oxygen.

4. Apparatus according to claim 3, wherein the hydrogen injector and oxygen injector are configured to provide the hydrogen and oxygen with suitable pressure and concentration so as to fill an upper portion of the combustion chamber so as to allow the pre-spark electrolyser circuit and control spark to ignite the hydrogen and oxygen inside the combustion chamber.

5. Apparatus according to claim 4, wherein the ignition system further comprises:

- a hydrogen regulator configured to provide the hydrogen from a hydrogen supply to the combustion chamber; and
- an oxygen regulator configured to provide the oxygen from an oxygen supply to the combustion chamber.

6. Apparatus according to claim 1, wherein the ignition system further comprises:

- a hydrogen injector configured to provide the hydrogen to the combustion chamber;
- an oxygen injector configured to provide the oxygen to the combustion chamber;
- a pre-spark electrolyser circuit to remove moisture from the igniter
- an ignition circuit configured to provide an ignition signal; and
- an igniter configured to respond to the ignition signal and ignite the combustible mixture of hydrogen and oxygen.

7. Apparatus according to claim 1, wherein the surrounding aqueous fluid in which the combustion chamber is submerged is water or other liquid capable of removing heat from the combustion chamber.

8. Apparatus according to claim 3, wherein the ignition system further comprises:

a pre-spark electrolyser circuit configured to respond to a pre-spark control timer signal, and to provide a pre-spark electrolyser circuit signal to energize the pre-spark electrolyser circuit by applying a voltage across a spark gap of the igniter to disperse the aqueous fluid on either a spark gap insulator or across spark gap electrodes which, if present, would inhibit an ignition spark.

9. Apparatus according to claim 8, wherein the ignition system further comprises:

a pre spark control timer configured to provide the pre spark control timer signal to the pre-spark electrolyser circuit.

10. Apparatus according to claim 3, wherein the ignition circuit includes a high voltage ignition circuit configured to provide a high voltage to ignite the combustible mixture of hydrogen and oxygen inside the combustion chamber.

11. Apparatus according to claim 8, wherein the pre-spark electrolyser circuit is configured either to electrically heat or break apart via electrolysis chamber aqueous fluid which may be present on the igniter, so as to enable an ignition process to occur in a wet environment.

12. Apparatus according to claim 1, wherein the ignition system is configured to provide a combustible mixture of hydrogen and oxygen simultaneously, or to provide separately hydrogen and oxygen that forms the combustible mixture inside the combustion chamber.

13. Apparatus according to claim 1, wherein the apparatus is a pump for pumping aqueous fluid.

14. Apparatus according to claim 1, wherein the combustion chamber comprises a wall capable of confining the combustion reaction of hydrogen and oxygen, transferring the heat of the reaction to the surrounding aqueous fluid in which the combustion chamber is submerged and receive new chamber aqueous fluid which enters the chamber via the intake valve based upon the difference in pressure.

15. Apparatus according to claim 1, wherein the underwater hydrogen and oxygen powered impulse engine comprises an intake check valve configured to receive the chamber aqueous fluid and substantially fill the combustion chamber based on the difference in pressure, that is created when the steam created inside the combustion chamber condenses to a liquid state.

16. Apparatus according to claim 1, wherein the underwater hydrogen and oxygen powered impulse engine comprises an exhaust check valve configured to provide the chamber aqueous fluid from the combustion chamber in response to the substantial increase in pressure on the chamber aqueous fluid inside the combustion chamber during the combustion reaction.

17. Apparatus according to claim 14, wherein the outer wall of the combustion chamber is configured to transfer the heat energy from the combustion reaction to the surrounding aqueous fluid in which the combustion chamber is submerged.

18. Apparatus according to claim 1, wherein the hydrogen and oxygen powered impulse engine comprises an intake check valve configured to respond to a vacuum effect created in the combustion chamber caused by the provisioning of the chamber aqueous fluid from the combustion chamber via an exhaust check valve which allows for the refilling of the combustion chamber with the new chamber aqueous fluid.

19. A method comprising:

providing a combustion chamber configured to be submerged in a surrounding aqueous fluid externally surrounding the combustion chamber and to fill with a chamber aqueous fluid;

providing an ignition system which is capable of providing hydrogen and oxygen into the combustion chamber so as to displace the chamber aqueous fluid at its top and create a relatively dry pocket of a combustible mixture of hydrogen and oxygen;

providing a pre-ignition electrolyser circuit which is capable of removing liquid from the igniter; and providing a control spark with a sufficient amount of energy to ignite the combustible mixture of hydrogen and oxygen so as to cause a combustion reaction and form steam that yields a specific amount of heat energy, that rapidly expands in volume and that results in a substantial increase in pressure on the chamber aqueous fluid contained therein, so that the chamber aqueous fluid is provided from the combustion chamber to an exhaust valve in response to the substantial increase in pressure on the chamber aqueous fluid contained therein, the heat energy from the reaction is transferred through the wall of the combustion chamber, to the aqueous fluid in which the combustion chamber is submerged so as to cause a substantial temperature decrease to occur inside the combustion chamber causing the steam to condense into liquid water and creating a vacuum within the combustion chamber, which results in a decrease in pressure inside the combustion chamber relative to outside of the combustion chamber so that the combustion chamber is substantially refilled with new chamber aqueous fluid via an intake valve, and a new ignition cycle is implemented and repeated by the ignition system by providing new hydrogen and oxygen, a new pre-ignition electrolyser signal and a new control spark.

20. Apparatus, including an underwater hydrogen and oxygen powered impulse engine, comprising:

a vessel substantially filled with an aqueous fluid;

a hydrogen inlet valve;

an oxygen inlet valve;

a combustion chamber submerged in said vessel and said aqueous fluid, comprising:

an aqueous fluid inlet valve;

an aqueous fluid exhaust valve;

an interior chamber configured to receive hydrogen, oxygen and aqueous fluid via said hydrogen, oxygen and aqueous fluid inlet valves;

an outer wall surrounding said interior chamber; and an ignition system configured to implement and repeat an ignition cycle comprising:

a pre-ignition electrolysis circuit configured to provide a pre-ignition supply of energy; and an ignition circuit configured to provide a control spark with a sufficient amount of energy to ignite a combustible mixture of hydrogen and oxygen in the combustion chamber; and wherein said combustion chamber is configured to:

receive aqueous fluid via the aqueous fluid inlet valve based on a difference in pressure of aqueous fluid in the interior chamber and aqueous fluid outside the outer wall of the combustion chamber, and substantially refill with aqueous fluid based on the difference in pressure;

receive hydrogen and oxygen therein so as to displace the aqueous fluid in the combustion chamber and create a relatively dry pocket of the ignitable mixture of hydrogen and oxygen;

receive energy from the pre-ignition electrolysis circuit; and receive the control spark to ignite the combustible mixture of hydrogen and oxygen inside the combustion chamber and cause a combustion reaction forming steam that yields a specific amount of heat energy which, rapidly expands in volume and results in a substantial increase in pressure on the aqueous fluid inside the combustion chamber;

wherein the aqueous fluid exhaust valve is configured to provide the aqueous fluid out of the combustion chamber in response to the substantial increase in pressure on the aqueous fluid inside the combustion chamber; and wherein the outer wall of the combustion chamber is configured to transfer the heat energy from the combustion reaction to the aqueous fluid in which the combustion chamber is submerged so as to cause a substantial temperature decrease to occur inside the combustion chamber, thus creating a vacuum inside the combustion chamber and a corresponding difference in pressure of the aqueous fluid inside the combustion chamber and the aqueous fluid surrounding the outer wall of the combustion chamber, and causing the combustion chamber to substantially refill with new aqueous fluid via the aqueous fluid inlet valve, allowing the ignition system to repeat a new ignition cycle.

* * * * *

UNITED STATES PATENT AND TRADEMARK OFFICE

CERTIFICATE OF CORRECTION

PATENT NO. : 8,881,499 B2
APPLICATION NO. : 13/465460
DATED : November 11, 2014
INVENTOR(S) : Timothy E. Dolan et al.

It is certified that error appears in the above-identified patent and that said Letters Patent is hereby corrected as shown below:

In the Claims

1. In column 14 at line 11, claim 1, "net" should be --inlet--.

Signed and Sealed this
Tenth Day of March, 2015

Michelle K. Lee

Michelle K. Lee
*Deputy Director of the United States Patent and Trademark Office*